Jan. 3, 1956  M. A. ADAMS  2,729,294
WELL SCREEN
Filed Aug. 7, 1953  2 Sheets-Sheet 1
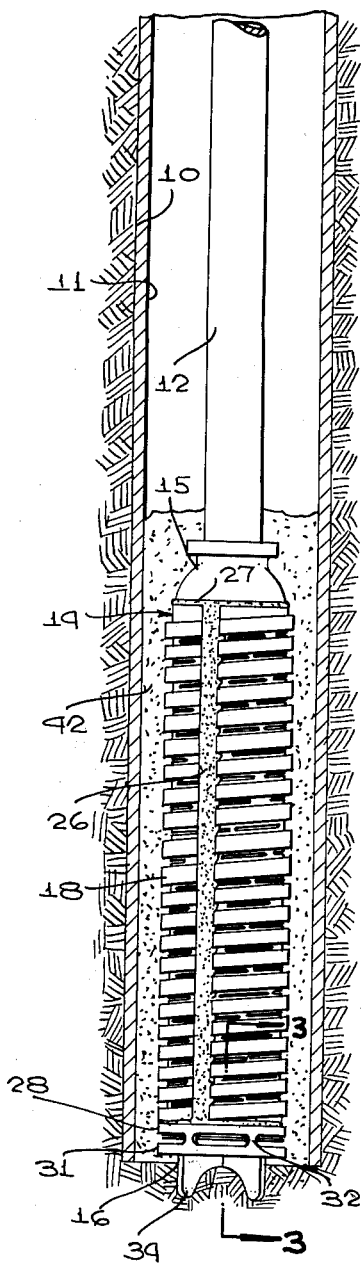
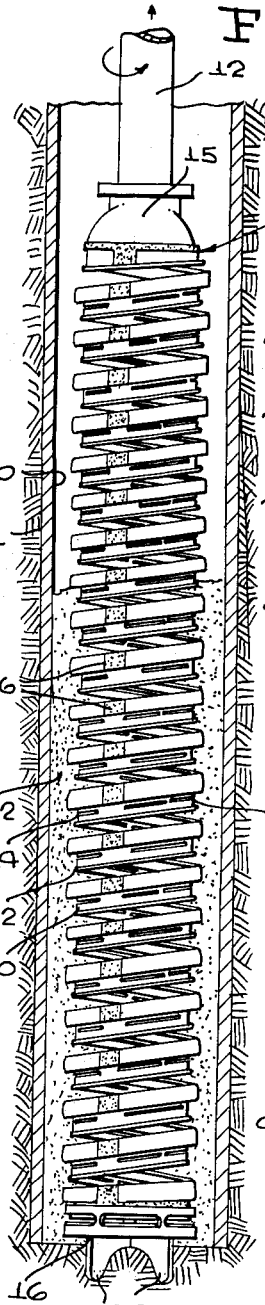
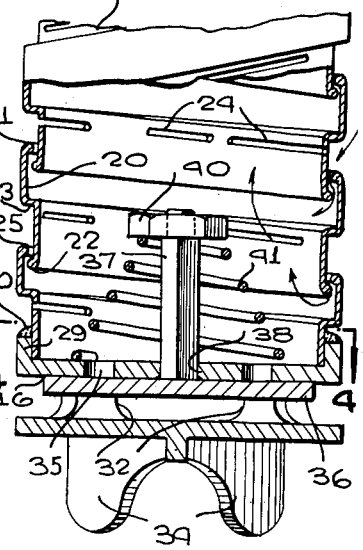
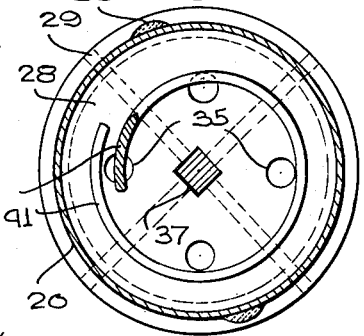
INVENTOR.
MOZEL A. ADAMS
BY
McMorrow, Berman & Davidson
ATTORNEYS Jan. 3, 1956    M. A. ADAMS    2,729,294
WELL SCREEN
Filed Aug. 7, 1953    2 Sheets-Sheet 2
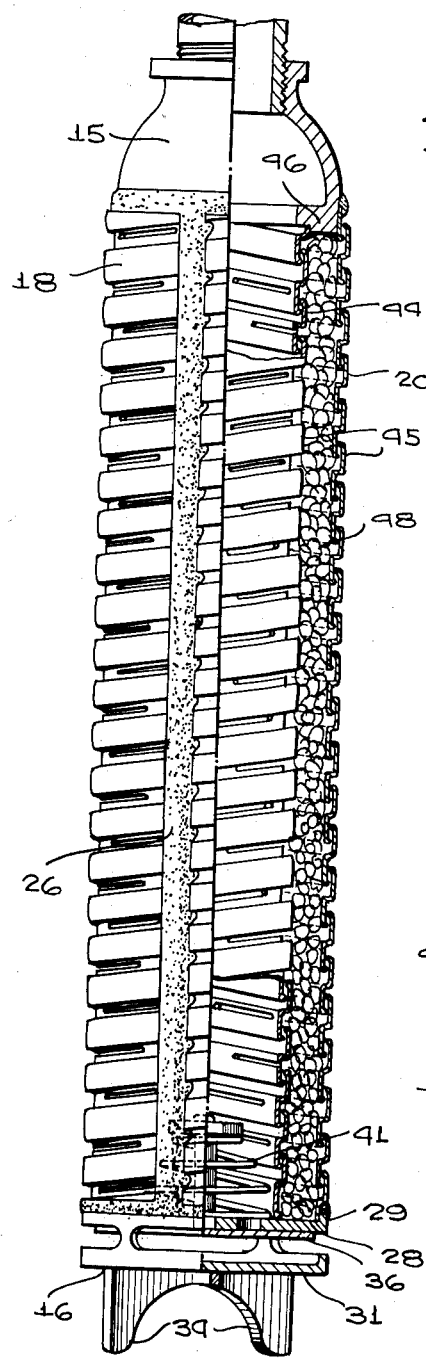
INVENTOR.
MOZEL A. ADAMS
BY
McMorrow, Berman + Davidson
ATTORNEYS

United States Patent Office 2,729,294
Patented Jan. 3, 1956

2,729,294
WELL SCREEN

Mozel A. Adams, Rayne, La., assignor of one-half to Carrol Vernon Radke, Jennings, La.

Application August 7, 1953, Serial No. 372,999

1 Claim. (Cl. 166—231)

This invention relates to well screens and more particularly to a tubular well screen formed of a helically wound metal strip which can be pulled as an unwound, single piece from a stuck or sanded in condition in the bottom of a well.

It is among the objects of the invention to provide an improved well screen or strainer which can be placed in the bottom of an oil or water well and connected to the bottom end of a flow pipe to strain or filter the production liquid rising through the flow pipe from the bottom of the well; which may be provided with screen slots or fissures of any desired width for filtering sand from the production liquid entering the screen, and which may include a layer of filtering material, such as sand or gravel; which is formed from a single metal strip wound to tubular form and held in adjusted position by strips of frangible material, such as solder, secured thereto; which has a back pressure valve secured to the bottom end thereof and is removable as a single piece including the back pressure valve from a stuck condition in the bottom of a well by unwinding of the strip of which the tubular screen is formed; which does not have to be cut up and removed piece-by-piece from a stuck condition in the bottom of a well; and which is simple and durable in construction, economical to manufacture, easy to place in and remove from a well, and effective and efficient in operation.

Other objects and advantages will become apparent from a consideration of the following description and the appended claims in conjunction with the accompanying drawings, wherein:

Figure 1 is a longitudinal cross sectional view through the bottom portion of the well showing a filter illustrative of the invention mounted in the bottom of the well and connected to the bottom end of a flow pipe;

Figure 2 is a view similar to Figure 1 but showing the manner in which the screen unwinds when it is pulled from a stuck condition in the bottom of the well;

Figure 3 is a fragmentary cross sectional view on an enlarged scale on the line 3—3 of Figure 1;

Figure 4 is a transverse cross sectional view on the line 4—4 of Figure 3;

Figure 5 is a side elevational view of a modified form of screen with a portion broken away and shown in cross section to better illustrate the construction thereof; and Figure 6 is a cross sectional view similar to Figure 1 but showing a further modified form of the screen with a portion of the screen broken away and shown in cross section to better illustrate the construction thereof.

With continued reference to the drawings, the numeral 10 indicates a well bore and the numeral 11 indicates a well casing extending downwardly through the bore to the bottom of the well. It is to be understood, however, that where the bottom of the well is in a hard formation, the casing may terminate short of the bottom of the well as is frequently the case. The numeral 12 designates a flow pipe extending downwardly through the well bore for the flow of production liquid, such as oil or water, from the bottom of the well to the surface and the numeral 14 generally designates a well screen operatively disposed in the bottom of the well and connected to the bottom end of the flow pipe 12.

The screen 14 comprises a diameter reducing pipe fitting 15 threaded onto the bottom end of the flow pipe 12, a back pressure valve 16 spaced from the fitting 15, the fitting and the back pressure valve being both substantially concentric with the longitudinal center line of the flow pipe 12, and a screen or filter 18 disposed between the fitting 15 and the back pressure valve 16 and connected at its upper end to the fitting and at its lower end to the back pressure valve.

The screen 18 comprises an elongated strip 20 of a suitable metal or metal alloy having oppositely directed flanges 21 and 22 along its side edges and a right angular offset 23 medially of its width so that the portions of the strip at the respectively opposite sides of the longitudinal center line of the strip are disposed substantially in spaced apart and parallel planes when the strip is in a straight condition.

In order to form the screen the strip 20 is wound to a tubular form of desired diameter, the screen illustrated in Figures 1 to 5 inclusive being substantially cylindrical in shape and the screen illustrated in Figure 6 being of substantially truncated conical shape tapering from its upward to its lower end.

The strip is so wound that the inwardly directed flange 21 of each coil of the strip overlies the outwardly directed flange 22 of the coil immediately thereabove so that the flanges can engage with each other and resist separation of the adjacent coils of the helically wound screen strip to a predetermined extent.

The strip 20 is provided with elongated, closed slots 24 spaced apart longitudinally of the strip and at one side of the angular offset 23 thereof and these slots are precisely cut to a predetermined width to exclude all sand above a predetermined grain size from the interior of the screen while permitting the free flow of liquid into the screen. The winding of the strip is also adjusted by tightening or loosening the winding to provide spiral openings or fissures between the adjacent ends of the coils of the strip 20 which fissures preferably have an effective width substantially equal to the width of the slots 24. After the winding of the strip has been adjusted to provide the fissures 25 of the desired width, strips of solder, as indicated at 26, are placed on the exterior of the screen and bonded thereto with the strips at substantially diametrically opposite locations around the screen and each strip extending longitudinally of the screen from one end to the other and the top end of the screen closely surrounds the larger end of the reduction fitting 15 and is secured thereto by an annular solder joint 27.

The back pressure valve 16 comprises a bottom plate 28 of circular shape having an annular flange 29 extending marginally therearound and receiving the bottom end of the screen 18, the screen being secured at its bottom end to the flange 29 of the plate 28 by an annular solder joint 30. A foot plate 31 is disposed below and substantially parallel to the bottom plate 28 and secured to the bottom plate by the angularly spaced apart lug formations 32 extending between and joined to the two plates and angularly spaced apart lug formations 34 extend downwardly from the undersurface of the foot plate 31 to engage in the formation at the bottom of the well and hold the back pressure valve and bottom end of the screen against rotation in the well.

The bottom plate 28 is provided with angularly spaced apart apertures 35 and a flapper valve plate 36 is disposed between the plates 28 and 31 and is effective to cover and close the apertures 35 from the bottom or outer side of the bottom plate 28. A stem 37 is secured at one end to the flapper valve plate 36 centrally of this plate and extends through a central aperture 38 in the bottom plate 28. A head or nut 40 is secured on the end of the stem 37 remote from the flapper valve plate 36 and a coiled compression spring 41 surrounds the stem 37 between the bottom plate 38 and the head or nut 40 and resiliently urges the flapper valve plate 36 against the bottom surface of the bottom plate 28 in closing relationship to the apertures 35 in the bottom plate.

The back pressure valve thus precludes sand and production liquid from flowing into the bottom end of the screen but will permit any sand or liquid in the screen to flow out of the bottom end of the screen when the screen is pulled from the well.

After the screen, constructed as described above, is secured to the bottom end of the flow pipe 12 and positioned in the bottom of the well it is effective to screen out the sand at the bottom of the well and permit production liquid substantially free of sand to enter the flow pipe 12 to rise through this flow pipe to the surface. It is highly important to maintain the production liquid free of sand as sand in the liquid has a destructive effect on pumps and other equipment used to raise the production liquid from the bottom of the well to the surface. After the screen has been in the well for a period of time, the sand flowing into the bottom of the well with the production liquid accumulates around the screen, as indicated at 42, and eventually rises to a height in the well such that it seriously interferes with the flow of production liquid into the screen and the bottom end of the flow pipe. When this occurs, it is necessary to pull the flow pipe and the screen from the well and clean the sand out of the bottom of the well. When the screen is sanded in at the bottom of the well in the manner indicated, it is in a stuck condition in the well and, with the screens currently in use, it is usually necessary to unthread the bottom end of the flow pipe from the screen, remove the flow pipe from the well and then cut the screen into small pieces with a suitable cutting tool and remove it piece-by-piece from the bottom of the well along with the sand. This is a tedious and time-consuming operation and greatly prolongs the time and increases the expense of cleaning or pumping the sand from the bottom of the well.

When it is necessary to remove a screen constructed in accordance with the present invention from the well it is necessary to merely pull the flow pipe 12 and the screen will follow the flow pipe out of the well in a one-piece condition. When the upward pull on the flow pipe reaches an extent greater than the structural strength of the solder strips 26, these strips break between the adjacent coils of the screen and the coils then separate, as illustrated in Figure 2, the strips eventually returning substantially to a straight condition as the upward pull on the flow pipe is continued. When the strip has been sufficiently unwound to exert an upward pull on the back pressure valve 16 this valve opens permitting fluid to flow downwardly to the valve to equalize the pressure above and below the valve and thus break any suction or vacuum which might tend to hold the valve in the bottom of the well. As soon as the suction on the back pressure valve is broken this valve will tilt to a position at which its diameter extends more or less longitudinally of the well and, in this position is moved upwardly through the sand in the bottom of the well by the pull on the flow pipe transmitted to the back pressure valve through the unwound strip 20 of which the screen 18 was constructed. When the bottom end of the flow pipe reaches the surface at the top end of the well the screen will follow the bottom end of the flow pipe in a one-piece condition including the back pressure valve 16 and any necessity for cutting the screen into small pieces and removing it piece-by-piece from the bottom of the well is thus entirely eliminated.

In the modified arrangement shown in Figure 5 an additional strip 44 similar in all respects to the strip 20 is wound to a tubular condition with a diameter less than the diameter of the outer screen 18. This inner screen 45 is disposed circumspatially within the outer screen 18 and extends longitudinally of the outer screen. The inner screen has its upper end disposed within and secured to the circular bottom flange or skirt 46 of the reduction fitting 15, the outer screen 18 surrounding at its upper end the skirt 46, but the bottom end of the inner screen 45 is not secured to the back pressure valve 16.

A layer 48 of filtering material such as "Ottawa Sand" or other suitable granular or fibrous material is disposed between the inner and outer screens 45 and 18 to add a further filtering effect to the slot and fissures provided in the outer screen and substantially exclude all sand and grit from the interior of the screen and from the flow pipe 12.

When the screen as illustrated in Figure 5 is pulled from the bottom of the well the inner screen 45, being smaller, will pull apart first loosening the packing material 48 which will be discharged from the screen assembly as the outer screen 18 also pulls apart. The strips of both the inner and outer screens will straighten out to a substantially straight condition as the screen is pulled from the well and the opening of the coils during the initial pull on the screen and the discharge of the packing material will permit the free pumping of fluid through the screen to flush the sand from the bottom of the well.

In the still further modified arrangement shown in Figure 6 the construction is the same as that shown in Figure 1 except that in this case, instead of the screen 18' being substantially cylindrical in shape it is of truncated conical shape tapering in diameter from its upward to its lower end and the upper end of this screen may surround and be secured to an externally screw threaded sleeve 50 threaded into an internally screw threaded flange 51 at the bottom end of a flow pipe 52 of large diameter. It is to be understood, however, that the upper end of the tapered screen may be secured to a reduction fitting 15 in the manner illustrated in Figures 1 and 5 and described above, without in any way exceeding the scope of the invention.

The invention may be embodied in other specific forms without departing from the spirit or essential characteristics thereof. The present embodimenets are, therefore, to be considered as illustrative and not restrictive in all respects, the scope of the invention being indicated by the appended claims rather than by the foregoing description, and all changes which come within the meaning and range of equivalency of the claims are, therefore, intended to be embraced therein.

What is claimed is:

A well screen comprising an elongated metal strip having oppositely directed lateral flanges along its side edges and closed slots of predetermined width spaced apart longitudinally thereof, said strip being spirally wound to tubular form with the oppositely directed flanges on the contiguous edges of adjacent coils disposed in opposed relationship, and at least one strip of solder material bonded to and extending longitudinally of said body to releasably hold the coils of said spirally wound strip in adjusted position relative to each other, a bottom plate marginally secured to an end of said screen body and having apertures therein, a foot plate secured to said bottom plate in spaced and substantially parallel relationship thereto and having lugs projecting from the side thereof remote from said bottom plate, a flapper plate disposed between said bottom plate and said foot plate, and spring means connected to said flapper plate and resiliently urging the latter to closing relationship to the apertures in said bottom plate.

References Cited in the file of this patent

UNITED STATES PATENTS

| | | |
|---|---|---|
| 899,054 | Johnson | Sept. 22, 1908 |
| 1,546,528 | Westphal | July 21, 1925 |
| 1,803,839 | Cavins | May 5, 1931 |
| 1,811,885 | Hill | June 30, 1931 |
| 2,353,881 | Crake | July 18, 1944 |